Sept. 7, 1954  M. D. SCHMIDT  2,688,347
ADJUSTABLE GUIDE FOR PORTABLE SAWS
Filed July 3, 1953
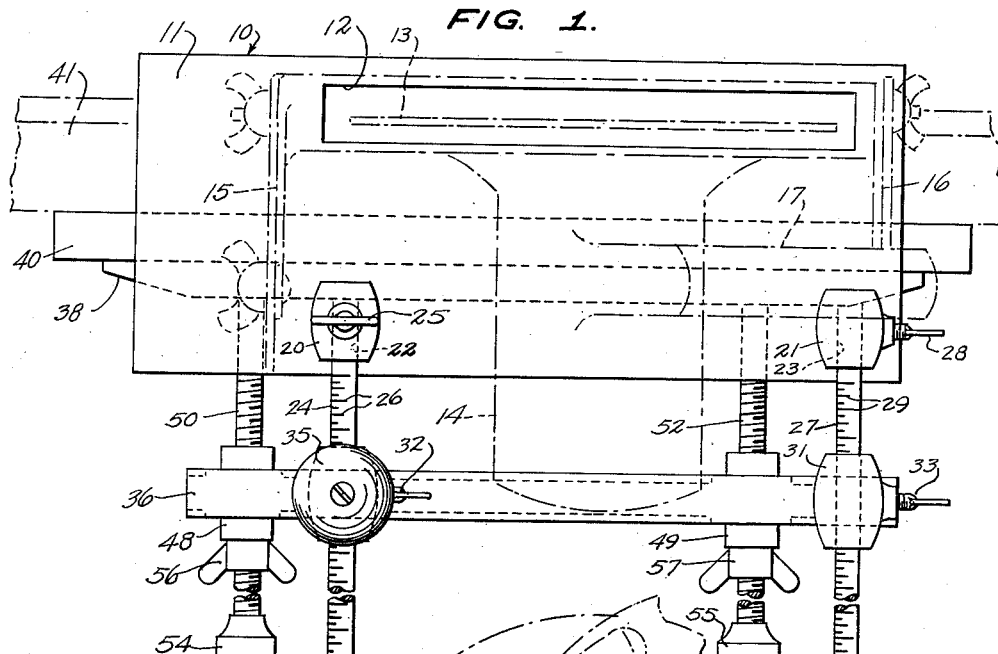
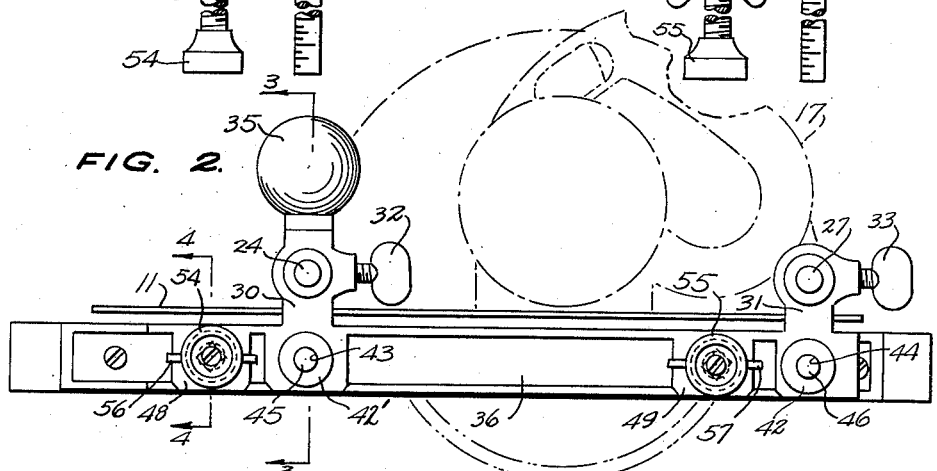
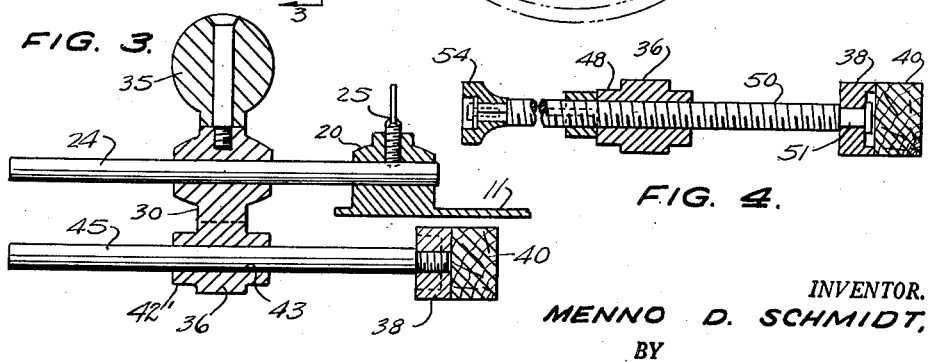
INVENTOR.
MENNO D. SCHMIDT,
BY
McMorrow, Berman & Davidson
ATTORNEYS Patented Sept. 7, 1954

2,688,347

UNITED STATES PATENT OFFICE 2,688,347

ADJUSTABLE GUIDE FOR PORTABLE SAWS

Menno D. Schmidt, Jacksonville, Oreg.

Application July 3, 1953, Serial No. 365,910

2 Claims. (Cl. 143—43)

This invention relates to guides for power operated hand saws and more particularly to a guide assembly which can be mounted directly on the saw to facilitate the use of the saw as a rip saw for reducing the width of boards, cutting grooves, and other purposes.

It is among the objects of the invention to provide a guide or gauge assembly which can be mounted directly on a power operated hand saw with no material modification of the saw construction and can be applied to and removed from the saw as desired; which provides a guide bar disposed below the saw plate in spaced and parallel relationship to the saw blade; which is adjustable to position the guide rail at different selected distances from the saw blade and has means for releasably locking the guide rail in selected positions of adjustment; which facilitates the use of a power hand saw for ripping or grooving lumber; which provides an additional handle for manually controlling the saw; and which is simple and durable in construction, economical to manufacture, convenient to use, and effective to increase the usefulness of a power hand saw.

Other objects and advantages will become apparent from a consideration of the following description and the appended claims in conjunction with the accompanying drawing, wherein:

Figure 1 is a top plan view of a saw plate and a guide assembly illustrative of the invention operatively mounted on the saw plate, other components of the saw being shown in broken lines;

Figure 2 is a side elevational view of the saw plate and guide assembly illustrated in Figure 1;

Figure 3 is a cross sectional view on the line 3—3 of Figure 2; and

Figure 4 is a cross sectional view on the line 4—4 of Figure 2.

With continued reference to the drawing, the power operated hand saw, generally indicated at 10, includes a flat saw plate 11 of elongated, rectangular shape having near one longitudinal edge thereof a longitudinally extending slot 12 of elongated, rectangular shape through which the saw blade 13 extends. The saw also includes a motor 14 mounted on a frame connected to the plate 11 by pivotal connections 15 and 16 so that the plate can be tilted relative to the saw blade, and a saw handle 17 connected to the motor 14 and extending laterally therefrom.

As electrically operated hand saws of the character indicated are old and well known to the art, a detailed illustration and description of the saw is considered unnecessary for the purposes of the present disclosure.

The saw plate 11 has an upper surface disposed adjacent the saw motor 14 and a lower surface disposed remote from the motor and the adjustable guide assembly comprises lugs 20 and 21 mounted on the plate 11 adjacent the longitudinal edge of the plate remote from the slot 12 at locations spaced apart along this edge and extending upwardly from the top surface of the plate. The lugs 20 and 21 are provided with bores 22 and 23 respectively extending therethrough and so positioned that the center lines of the bores are parallel to the plate 11 and at right angles to the longitudinal edge of the plate adjacent the lugs. A rod 24 has one end inserted in the bore 22 of the lug 20 and a set screw 25 extends through a tapped hole in the lug and engages the rod 24 at its inner end to releasably secure the rod in the lug. The rod is provided with a scale 26 of lineal measurement extending longitudinally thereof and extends outwardly from the adjacent side edge of the saw plate. A rod 27 similar to the rod 24 has one end inserted into the bore 23 of the lug 21 and releasably secured therein by a set screw 28 threaded through a tapped hole in the lug and having its inner end in engagement with the rod 27 and the rod 27 is also provided with a longitudinally extending scale of lineal measurement 29. The rods 24 and 27 are disposed in spaced apart and substantially parallel relationship to each other and extend outwardly from the adjacent edge of the plate 11 with their longitudinal center lines substantially parallel to this plate and perpendicular to the adjacent side edge of the plate.

Slide blocks 30 and 31 are slidably mounted on the rods 24 and 27 respectively outwardly of the adjacent side edge of the plate 11 and are held in selected positions longitudinally of the corresponding rods by set screws 32 and 33 threaded through tapped holes in the blocks 30 and 31 respectively and having their inner ends in engagement with the the corresponding rods. These slide blocks 30 and 31 depend from the rods 24 and 27 and a hand knob 35 is mounted on the upper end of the block 30 to provide a handle in addition to the saw handle 17 for manually controlling the saw.

An elongated bar 36 is disposed below and outwardly of the side edge of the plate 11 adjacent the lugs 20 and 21 and substantially parallel to this side edge of the plate and is secured to the bottom ends of the slide blocks 30 and 31.

A second bar 38 is disposed below the plate 11 in spaced and parallel relationship to the bar 36 and a guide rail 40, formed of a suitable material such as hard wood, is secured to the bar 38 at the side of this bar remote from the bar 36 and is adapted to rest against an edge of a lumber work piece 41 to guide the saw longitudinally of the work piece.

The rail 36 is provided with apertured bosses 42 and 42' having bores 43 and 44 disposed directly below the rods 24 and 27 respectively with their longitudinal center lines parallel to these rods and guide rods 45 and 46 extend slidably through the bores of the bosses 42 and 42' respectively and are secured at corresponding ends to the reinforcing bar 38 as by having screw threaded end portions thereof threaded into tapped holes in the bar 38, as illustrated in Figure 3. As stated above, the guide rods 45 and 46 are parallel to the rods 24 and 27 and maintain the reinforcing bar 38 and guide rail 40 parallel to the saw plate 11 and to the bar 36.

The bar 36 is also provided with boss formations 48 and 49 disposed adjacent the bosses 42 and 42' respectively and having screw threaded bores extending therethrough parallel to the bores 43 and 44. A screw shaft 50 is threaded through the bore of the boss 48 and is rotatably connected at its end adjacent the reinforcing bar 38 to this bar, as indicated at 51 in Figure 4, and a screw shaft 52 is threaded through the screw threaded bore of the boss 49 and rotatably connected at its end adjacent the reinforcing bar 38 to this bar in the same manner as that in which the screw shaft 50 is connected to the bar 38. The screw shafts 50 and 52 are disposed in parallel relationship to each other and to the plate 11 and at right angles to the longitudinal edge of the plate from which the rods 24 and 27 extend and are effective, when rotated, to move the bar 38 and guide rail 40 toward or away from the bar 36 to thereby adjustably vary the distance between the saw blade 13 and the adjacent side of the guide rail 40.

The screw shafts 50 and 52 are provided on their ends remote from the bar 38 with hand knobs 54 and 55 respectively for manually rotating the screw shafts and wing locking nuts 56 and 57 are threaded onto the screw shafts 50 and 52 at the ends of the bosses 48 and 49 adjacent the knobs 54 and 55 to releasably lock the screw shafts in adjusted position relative to the bar 36. With this arrangement, the guide rail 40 will remain parallel to the saw blade 13 and can be adjustably set at various distances from the saw blade to position the saw blade at desired distances from an edge of a lumber work piece.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a power hand saw having a plate of rectangular shape provided with a slot through which the saw blade extends, an adjustable guide assembly comprising lugs mounted on said plate at locations spaced apart along one longitudinal edge of the plate and extending from the top surface of the plate, each of said lugs having a bore extending therethrough with its center line substantially parallel to the plate and at right angles to said one longitudinal edge thereof, rods releasably secured one in each of said lugs and extending from said lugs in spaced and substantially parallel relationship to each other, slide blocks mounted one on each of said rods and releasably secured to said rods at selected positions of adjustment therealong, a bar carried by said slide blocks below and substantially parallel to said one longitudinal edge of said plate, a guide rail disposed below said plate in spaced and parallel relationship to said bar, and screws rotatably connected to said guide rail at locations spaced apart therealong and extending from said guide rail in parallel relationship to each other through tapped holes in said bar for adjustably moving said guide rail toward and away from said bar.

2. In combination with a power hand saw having a plate of rectangular shape provided with a slot through which the saw blade extends, an adjustable guide assembly comprising lugs mounted on said plate at locations spaced apart along one longitudinal edge of the plate and extending from the top surface of the plate, each of said lugs having a bore extending therethrough with its center line substantially parallel to the plate and at right angles to said one longitudinal edge thereof, rods releasably secured one in each of said lugs and extending from said lugs in spaced and substantially parallel relationship to each other, slide blocks mounted one on each of said rods and releasably secured to said rods at selected positions of adjustment therealong, a bar carried by said slide blocks below and substantially parallel to said one longitudinal edge of said plate, a guide rail disposed below said plate in spaced parallel relationship to said bar, screws rotatably connected to said guide rail at locations spaced apart therealong and extending from said guide rail in parallel relationship to each other through tapped holes in said bar for adjustably moving said guide rail toward and away from said bar, said bar having bosses at locations spaced apart therealong and provided respectively with bores the longitudinal center lines of which are parallel to said rods, and guide rods secured to said guide rail at spaced apart locations therealong and extending slidably through the bores of the bosses on said bar to retain said guide rail in parallel relationship to said saw plate and said bar.

References Cited in the file of this patent

UNITED STATES PATENTS

| Number | Name | Date |
|---|---|---|
| Re. 17,087 | Billingsley | Sept. 25, 1928 |
| 564,753 | Jury et al. | July 28, 1896 |
| 1,706,115 | Hannah | Mar. 19, 1929 |
| 1,885,087 | De Witt | Oct. 25, 1932 |
| 2,587,994 | Gregory | Mar. 4, 1952 |